May 24, 1966 W. G. WALTERMIRE 3,252,495
BOLT WITH A KNURLED BARREL-SHAPED SHANK
Original Filed Feb. 18, 1959

INVENTOR.
WILLIAM G. WALTERMIRE
BY Williams, David,
Hoffmann & Yount.
ATTORNEYS

United States Patent Office 3,252,495
Patented May 24, 1966

3,252,495
BOLT WITH A KNURLED BARREL-SHAPED SHANK
William G. Waltermire, Seven Hills, Ohio, assignor to The Lamson & Sessions Company, Cleveland, Ohio, a corporation of Ohio
Original application Feb. 18, 1959, Ser. No. 794,039, now Patent No. 3,047,036, dated July 31, 1962. Divided and this application July 23, 1962, Ser. No. 211,741
The portion of the term of the patent subsequent to July 30, 1979, has been disclaimed
2 Claims. (Cl. 151—41.73)

This application is a divisional application of my application Serial No. 794,039, filed February 18, 1959, and issued as Patent No. 3,047,036 on July 31, 1962, and which was a continuation-in-part application of Serial No. 758,767, filed September 3, 1958, and now abandoned, and application Serial No. 591,610, filed June 15, 1956, now abandoned, which was, in turn, a continuation-in-part of application Serial No. 543,635, filed September 16, 1955, now abandoned.

The present invention relates to fasteners and more particularly to a high tensile fastener of the interference body type.

An interference body bolt is a bolt having projections on the shank thereof designed to interfere with the host members for the fastener. The interference body bolt to which the present invention relates is a bolt having a plurality of knurl projections thereon, preferably arranged in intersecting rows, and designed to interfere with the side walls of the receiving opening of the host member. Problems have been encountered when the knurl projections in this type of bolt are designed to resist shearing upon insertion of the bolt. If the knurl projections shear, the bolt will have little resistance to turning in the receiving holes in the host members, little back-out resistance, and will lose their bound body fit. Therefore, it is desirable that the shearing of the knurls be kept to a minimum as the bolt is driven into the receiving opening.

When the knurl projections are designed to minimize shearing of the knurls, a problem arises when inserting the bolt into misaligned holes in receiving members therefor. A problem which has been encountered is that the bolt after insertion into misaligned holes would remain in a cocked position and would not straighten.

An object of the present invention is to provide a bolt for structural joints and the like of the interference body type which is so constructed and arranged that the bolt is able to rock and straighten itself when inserted into misaligned holes in the receiving members.

A further object of the present invention is to provide a new and improved interference body bolt having interfering knurl projections arranged in rows extending lengthwise of the shank whereby the knurl projections in each row follow the groove indented in the host member by the preceding knurl projections of the row, the knurled part of the bolt having a central portion of maximum diameter and progressively decreasing in diameter proceeding from the central portion to each end of the knurled shank.

Another object of the present invention is to provide a bolt of the interference body type wherein the bolt will rock to straighten when it is inserted into misaligned holes in the receiving members for the bolt when the head of the bolt engages the adjacent receiving member and additional forces are applied to the bolt to cause the head to seat against the receiving member.

Further objects and advantages of the present invention will be apparent from the following detailed description of the preferred embodiment thereof made with reference to the drawing forming a part of this specification and in which.

In accordance with the present invention, the insertion of a fastener of the interference body type having a knurled shank formed by knurl projections arranged in lengthwise extending rows, the entry end of the knurled portion is tapered from a relatively small outside diameter adjacent the entry end to a maximum outside diameter at the central portion of the shank. Preferably, the entry taper extends for approximately one-third of the knurled portion. The trailing part of the knurled portion is also provided with a taper. This trailing taper extends from a diameter slightly smaller than that of the hole at the trailing end of the knurled portion, forwardly and outwardly to the central or intermediate portion or part of the knurled portion. The trailing taper may be shorter than the entry taper and the intermediate part of maximum outside diameter may be spaced axially rearwardly of the midpoint of the knurled portion. When the bolt is drawn into misaligned holes in receiving members to be connected by the bolt, the compound taper thereon will allow it to rock in its receiving aperture and to straighten itself so that the fastener will be perpendicular to the receiving members. The knurled portion of the bolt may be described as having a portion of maximum outside diameter intermediate its ends with its outside diameter progressively decreasing proceeding in both directions from the portion of maximum outside diameter toward the ends to define a barrel-shaped knurled portion.

Figure 1:
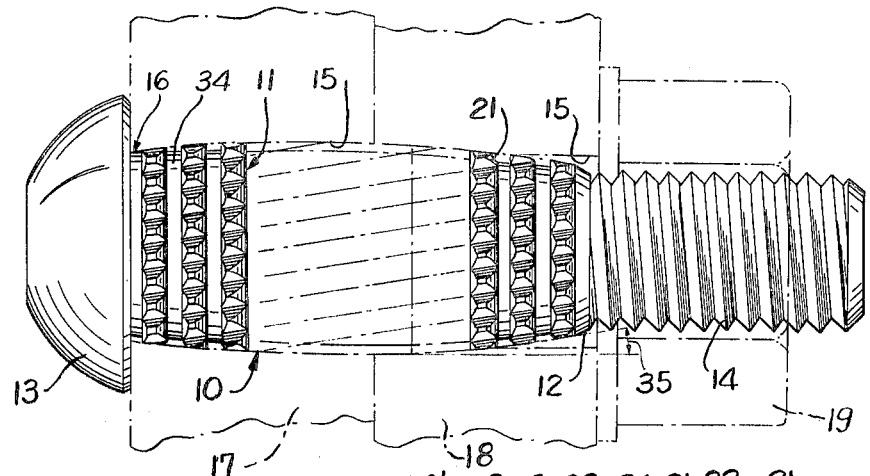
FIG. 1 is an elevational view of a bolt embodying the present invention and illustrating the use of the bolt to connect plate members shown in dot-dash lines.

As one practical embodiment of this invention, FIG. 1 of the drawing shows a headed member or bolt 10 having interfering projections or knurling 11 thereon. The bolt 10 is here shown as being of the above-mentioned bolt type and comprises a stem 12 having a head 13 at one end thereof and a threaded portion 14 at its other end. The knurling 11 is carried by the intermediate portion or shank 16 of the stem 12 and extends therealong for a desired distance, in this case the knurling being shown as extending for substantially the full distance between the head 13 and the threaded portion 14.

FIG. 1 of the drawing illustrates one use of the knurled bolt 10 and in this use the bolt extends through bolt holes 15 provided in a pair of plate members 17 and 18 and clampingly holds the plate members between the head 13 and a nut 19 applied to the threaded stem portion 14. The knurled shank 16 of the stem 12 is here shown as being of substantially the same axial length as the combined bolt holes 15. The knurling 11 produces a desired strong connection between the bolt and the plate members 17 and 18 when the bolt is driven or drawn into the bolt hole 15, such that the bolt will be held against rotational and back-out movements relative to the bolt hole.

The knurling 11 preferably comprises co-extending axial rows of knurl projections or elements 21 which are formed or swaged solid segments of the metal of the stem of the bolt 10. The knurl elements 21 can be formed on the shank of the stem 12 by any suitable method of operation and tools, such as by a rolling operation between cooperating knurling dies, during which the elements are swaged or generated on the stem. After the knurl elements 21 and the thread 14 have been formed on the stem 12, the bolt 10 may be suitably hardened by any appropriate known hardening procedure.

The described knurl elements 21 are preferably of the type disclosed in my copending Patent No. 3,047,036 and extend along the shank of the stem 12 in the general direction of the longitudinal axis thereof and converge radially outwardly from a base 21a at the shank of the bolt to an apex or place of maximum height adjacent the trailing end of the projection and have frontal sections or tops 22 thereof sloped or tapered from the apex to a minimum height at the other end, such that each knurl element has a relatively low entry end 23 leading the knurl projection when moved in the direction of the axial movement of the knurled portion when the latter is being drawn or driven into the opening of the associated part, and a relatively high trailing or buttress end portion 24 facing in the opposite axial direction and which cooperates with the wall of the opening for resisting turning and back-out movements, as will be further explained hereinafter. The base 21a of each knurl element is of substantially rectangular configuration and has, therefore, a substantially uniform width throughout its length.

Figure 2:
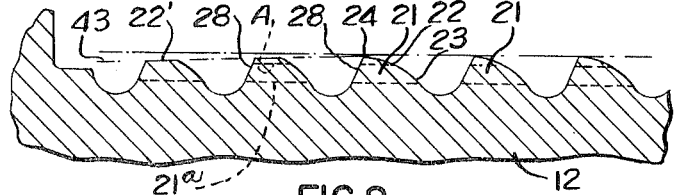
FIG. 2 is a sectional view taken along the crestline of the knurl elements of the bolt in FIG. 1.

The knurl elements 21 are formed with the sloping tops 22 thereof convexly curved for a substantial or major portion of their full length, as is shown in FIG. 2 of the drawings. The curved tops 22 provide convexly curved entry faces or frontal sections facing in the forward direction. The tops 22 of the knurl elements, in addition to being curved, are, when viewed in plan, relatively narrow at their ends adjacent the high point and relatively wide at their forward ends adjacent the base of the projections and may include a flat 22' at the narrow end thereof. The buttress end portion 24 of the knurl element 21 has an upright, relatively inclined transverse end wall 28.

From the shape of the knurl element 21 as thus far described, it will be seen that this knurl element is a sloping solid segment having a truncated relatively high end at the rear or trailing end thereof and providing a rearwardly facing inclined end wall 28, and also having a forwardly and downwardly sloping entry portion or lead end providing a convexly curved entry face, narrow at the apex as compared to its width at the base.

Another characteristic of the knurling 11 is that the knurl projection, because of its shape and relatively large shear area adjacent its outermost end, strongly resists shearing as the knurled shank is driven or drawn into the receiving member, and both the elastic and plastic distortion of the knurl elements 21 will occur during the driving. Although some shearing of the knurl elements may result from the driving, the construction is such as will provide minimum damage to the knurl elements and such distortion of the elements as does actually occur will contribute to the holding power of the knurling in the opening of the associated part. Thus, when the metal of the knurling is harder than the metal of the associated part, the rigid tops of the knurl elements will indent into the internal wall of the associated part and the distortion of the knurl elements will consist mainly of an elastic distortion, such that the tendency for the metal of the knurl elements will be to spring back to its original shape and condition, thereby pressing the tops of the knurl elements firmly against the associated part.

The resistance of the disclosed knurl projections to shear will be appreciated when it is noted that the knurl projections, because of the curved top, have a relatively large shear area adjacent their apexes. The dotted line A in FIG. 2 indicates the designed line of interference of the side wall of the receiving opening with the knurl projections and it will be noted that the shear area of the knurl is not seriously affected if this line is shifted radially outwardly or inwardly.

Therefore, the proper operation of knurling is not dependent on exact hole sizing, and the bolt 10, therefore, is less sensitive to hole sizing than bolts of the same type having other types of knurling thereon.

As shown in FIG. 1, the rows of the knurl elements 21 are disposed so as to extend helically along the stem 12 at a suitable pitch angle with the elements of each row spaced from each other by a groove as indicated at 34. In the drawing, the pitch angle of the rows is shown is being 10° but this can be varied as desired or to suit the requirements of the products under consideration. During the driving or drawing of the knurled portion into the opening of the associated part, the rows of elements will displace the host material to form receiving grooves with the elements of each axially extending row following in the same groove as the other elements.

The dimensions and proportions of the individual knurl elements 21, as well as the spacing of the adjacent rows of those elements, can be varied as desired in the knurled article to suit the size, hardness, and other characteristics of the knurled article and of the associated part with which it is to be used.

Figure 3:
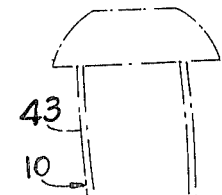
FIGS. 3, 4 and 5 illustrate the steps of inserting the bolt of FIG. 1 in misaligned holes in a pair of plates to be connected.

The outside diameter of the knurled shank of the bolt 10 is in accordance with the present invention tapered for a substantial part of the length thereof from a point intermediate the ends of the knurled shank to a smaller outside knurled shank diameter adjacent the threaded portion of the fastener to provide a leading taper; preferably, the leading taper is about one-third the length of the knurled shank. This leading taper is indicated by angle 35 in FIG. 1. The taper is provided primarily to facilitate the insertion of the bolt 10 into receiving holes in the members 17, 18 particularly when the holes are misaligned, as in FIG. 3. In FIG. 3, the outside periphery of the knurled portion is indicated by dotted lines 43.

Figure 4:
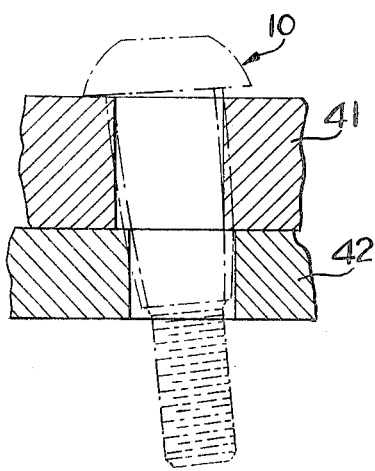
Figure 5:
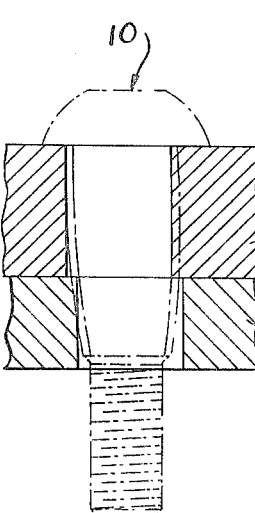

The outside diameter of the knurled shank also progressively decreases proceeding rearwardly from the central part having the maximum outside diameter. The trailing taper provides clearance or relief which facilitates the rocking of a cocked bolt in misaligned receiving holes to effect the straightening of the bolt. This straightening will occur when the head of the tilted bolt engages the adjacent member and the bolt is driven or drawn home. The edge of the head which first engages the adjacent member will act in the nature of a fulcrum about which the bolt straightens as the head is seated. FIGS. 3, 4 and 5 illustrate the insertion of the bolts in misaligned holes 40 in plates 41, 42 to be connected by the bolt. The outline of the outside diameter of the knurling is indicated diagrammatically in FIGS. 3, 4 and 5, and the trailing taper line has been designated by the reference numeral 43 and is clearly shown in FIG. 2 as inclined with respect to the line of maximum knurl diameter that extends parallel to the bolt axis, the view of FIG. 2 being a sectional view taken along the crestline of an axially extending row of knurl projections.

As can be seen by reference to FIG. 3, the leading taper on the knurled shank of the bolt will allow the leading end of the bolt to be inserted to such an extent that the leading end of the bolt is beyond the shoulder provided by the misaligned holes for many holes where this would not be possible without the taper. In the absence of a leading taper, the knurled portion tends to immediately center the bolt in the hole of the first member 41 and does not facilitate its cocking to allow the entry end to pass beyond the shoulder caused by misalignment of the holes in members 41 and 42. Furthermore, in the absence of a leading taper, the forces tending to straighten the bolt as it enters and goes through member 42 are such to cause an extreme burring of the threads when the bolt is driven or pulled home even though the misalignment is such as to permit the leading end to be inserted to a point beyond the entry ply 41 before the knurled portion engages the entry ply and rights the bolt. It can be seen, therefore, that the entry taper facilitates the use of a bolt with holes having a misalignment which would in practice preclude the use of a bolt having a knurled shank designed to interfere the same amount for the entire shank length with the host members and not having an entry taper thereon as it would require excessive and costly reaming or drifting of the holes. Furthermore, the forces required to right the bolt due to the driving or drawing of the bolt into the aperture are not as great with an entry taper and the burring of the threads when the bolt is inserted into misaligned holes is minimized.

It is important, when the bolt has been driven or drawn home, that the bolt be straight, i.e., its axis perpendicular to the plates. The trailing taper on the knurled shank facilitates the rocking of the bolt to a straightened position. FIG. 4 shows the bolt inserted to a point where the head is in engagement with the entry ply and illustrates the cocked position which the bolt has assumed during the initial steps of insertion to allow the threaded portion thereof to clear the shoulder provided by the misaligned holes in the plates 41, 42 and because of the forces set up during insertion, while FIG. 5 shows the bolt after it has rocked to a straightened position. It will be noted that during the rocking movement, the knurls on those portions of the bolt which may be considered as leading the bolt in its rocking movement tend to embed themselves by moving sideways into the grooves in the side wall of the receiving hole made by the other projections in the same rows. Under these conditions the knurls can be said to have a movement which includes a sideways component as well as an axial component.

Figure 6:
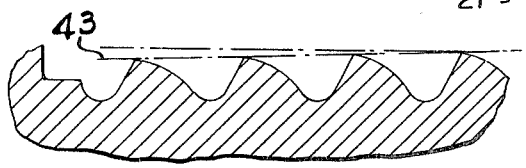
FIG. 6 also shows a modified form of a knurl projection.

The trailing taper of the knurled shank may be provided by allowing underfilling of the rolling dies and the knurl projections particularly along the trailing taper, may have flats, as shown in FIG. 2 and designated by the reference numeral 22′, due to the underfilling of the dies. In this case the projections will have different heights proceeding axially of the shank to define the taper. The entry end 23 of each projection will, however, be a radius curve. The knurl elements of the trailing taper of such a fastener are shown in section in FIG. 6. It will be noted from FIG. 1 that the knurl elements on the leading taper may also have flats due to underfilling of the dies.

While the preferred form of the present invention has been described in considerable detail, further modifications, constructions and arrangements will fall within the ability of those skilled in the art and it is hereby my intention to cover all such constructions, modifications and arrangements which fall within the ability of those skilled in the art and within the scope and spirit of the present invention.

Having described my invention, I claim:

1. A structural fastener for connecting a pair of metallic host members having holes therein for receiving the fastener, said fastener having a head and a knurled shank extending from said head and adjusted to be received in the holes and a threaded portion disposed adjacently and forwardly of the shank to extend outwardly of the holes to receive a nut to apply a clamping pressure to said host members, said knurled shank comprising a plurality of individual rolled knurl projections located on all sides of the shank and including a plurality of individual projections arranged in rows and extending axially along the length of the shank and extending radially from the shank to interfere with the material of the host members adjacent the holes, said projections on the shank having different radial heights and the individual projections at an intermediate portion of the shank having a radial height which defines a maximum outside diameter for the knurled shank and the radial height of the individual projections on the shank proceeding axially in both directions from the intermediate portion progressively decreasing to define successively smaller outside diameters for the knurled shank with the projections defining the successively smaller outside diameters being partially formed incomplete projections.

2. A structural fastener for connecting a pair of metallic host members having holes therein for receiving the fastener, said fastener having a head and a knurled shank extending from said head and adapted to be received in the holes and a threaded portion disposed adjacently and forwardly of the shank to extend outwardly of the holes to receive a nut to apply a clamping pressure to said host members, said knurled shank comprising a plurality of individual rolled knurl projections located on all sides of the shank and including a plurality of individual projections arranged in rows and extending axially along the length of the shank and extending radially from the shank to interfere with the material of the host members adjacent the holes, said projections on the shank having different radial heights and the individual projections at an intermediate portion of the shank having a predetermined form and radial height which defines a maximum outside diameter for the knurled shank and the individual projections on the shank proceeding axially in both directions from the intermediate portion being truncated forms of said projections at said intermediate portions and having a radial height which progressively decreases to define successively smaller outside diameters for the knurled shank with the truncated projections defining the successively smaller outside diameters.

References Cited by the Examiner

UNITED STATES PATENTS

| | | | |
|---|---|---|---|
| 1,006,601 | 10/1911 | Speller | 80—60 |
| 1,496,083 | 6/1924 | Browne | 80—60 |
| 2,191,771 | 2/1940 | Olson | 80—5.1 |
| 2,380,287 | 7/1945 | Baumbach | 85—21 |
| 2,949,142 | 8/1960 | Sumerak | 151—41.73 |
| 3,047,036 | 7/1962 | Waltermire | 151—41.73 |

EDWARD C. ALLEN, *Primary Examiner.*

CARL W. TOMLIN, M. HENSON WOOD, JR.,
*Examiners.*

M. PARSONS, JR., *Assistant Examiner.*